US006297202B1

(12) United States Patent
Chatterji et al.

(10) Patent No.: US 6,297,202 B1
(45) Date of Patent: *Oct. 2, 2001

(54) DEFOAMING COMPOSITIONS AND METHODS

(75) Inventors: Jiten Chatterji, Duncan; Roger S. Cromwell, Walters; Bobby J. King, Duncan, all of OK (US)

(73) Assignee: Halliburton Energy Services, Inc., Duncan, OK (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,783

(22) Filed: Jan. 4, 1999

(51) Int. Cl.[7] ................................................ C09K 3/00
(52) U.S. Cl. .................. 507/261; 507/269; 507/906; 507/921; 507/202; 516/34
(58) Field of Search ................ 516/34; 507/136, 507/261, 140, 269, 906, 202, 921

(56) References Cited

U.S. PATENT DOCUMENTS

| 3,560,403 | 2/1971 | O'Hara et al. ................ 252/358 |
| 3,763,021 | 10/1973 | Householder .................. 203/20 |
| 4,258,790 | 3/1981 | Hale .............................. 166/293 |
| 4,631,145 | 12/1986 | Zychal .......................... 252/321 |
| 4,780,220 | 10/1988 | Peterson ..................... 252/8.514 |
| 5,015,273 | 5/1991 | Hamilton et al. .................. 55/53 |
| 5,169,561 | 12/1992 | Gentle et al. ................. 252/321 |
| 5,523,019 | * 6/1996 | Kim ................................ 516/34 |
| 5,547,022 | 8/1996 | Juprasert et al. ............. 166/263 |
| 5,858,928 | 1/1999 | Aubert et al. ................. 507/135 |
| 5,942,469 | 8/1999 | Juprasert et al. ............. 507/261 |

FOREIGN PATENT DOCUMENTS

| 562912 | 6/1987 | (AU) | C08G/77/04 |
| 0 091 257 B1 | 10/1983 | (EP) | B01D/19/04 |
| 0 339 762 A2 | 11/1989 | (EP) | C09K/7/02 |
| 0 351 828 B1 | 1/1990 | (EP) | B01D/19/04 |
| 0 475 568 A1 | 3/1992 | (EP) | C04B/28/02 |
| 2 218 136 | 11/1989 | (GB) | E21B/21/06 |
| 2 244 279 | 11/1991 | (GB) | B01D/19/04 |
| 2 243 559 | 10/1994 | (GB) | B01D/19/02 |
| WO91/00763 | 1/1991 | (WO) | C08K/5/06 |
| 91/01171 | * 2/1991 | (WO) . | |

OTHER PUBLICATIONS

Russian Abstract No. 576073, (1992).

* cited by examiner

*Primary Examiner*—Philip Tucker
(74) *Attorney, Agent, or Firm*—Craig W. Roddy; C. Clark Dougherty, Jr.

(57) ABSTRACT

The present invention provides improved defoaming compositions and methods. The compositions of the invention are basically comprised of polypropylene glycol, particulate hydrophobic silica and a liquid diluent.

14 Claims, No Drawings

DEFOAMING COMPOSITIONS AND METHODS

BACKGROUND OF THE INVENTION

1. Field of the Invention

The present invention relates to defoaming compositions and methods, and more particularly, to such compositions and methods for preventing the formation of foam or breaking foam in well treating fluids.

2. Description of the Prior Art

Defoaming compositions and agents have long been used in the oil and gas industry to prevent the formation of a foam or to destroy a previously formed foam. The defoaming compositions are commonly utilized as components in well treating fluids to prevent the formation of foam during the preparation and/or pumping of the treating fluids. Also, defoaming compositions have been utilized heretofore for breaking previously formed foamed well treating fluids. That is, when a stable foamed well treating fluid must be disposed of on the surface, a defoaming composition is added to the fluid to destroy the foam whereby the non-foamed components of the treating fluid can be readily disposed of.

A variety of defoaming compositions and agents have been utilized heretofore. Examples of such defoaming compositions and agents utilized in well treatment fluids include tributyl phosphate and acetylenic diol which are environmentally unsafe. Other prior art defoaming agents which are environmentally safe include polypropylene glycol and a mixture of polypropylene glycol with a copolymer of ethylene oxide and propylene oxide monomers. While these defoamers function adequately to prevent the formation of foam in well treating fluids when they are prepared and pumped, they do not function adequately for defoaming previously formed foamed well treating fluids, and particularly, previously formed foamed well cement slurries.

Thus, there is a continuing need for improved environmentally safe defoaming compositions for use in various fluids including well treatment fluids.

SUMMARY OF THE INVENTION

The present invention provides improved environmentally safe defoaming compositions and methods which meet the needs described above and overcome the deficiencies of the prior art. The compositions of the invention are basically comprised of polypropylene glycol, particulate hydrophobic silica and a liquid diluent. While various liquid diluents can be utilized, those which are particularly suitable include fatty acid methyl esters, olefins having one or more internal double bonds, alpha-olefins, polyalpha-olefins and linear paraffins.

A preferred defoaming composition of this invention is comprised of polypropylene glycol having a molecular weight of about 4,000 present in the composition in an amount of about 30% by weight thereof, a particulate hydrophobic silica comprised of silicone oil treated precipitated silica present in the composition in an amount of about 16% by weight thereof and an olefin having from about 11 to about 14 carbon atoms and one or more internal double bonds present in the composition in an amount of about 54% by weight thereof.

A method of the present invention for preventing the formation of foam in a well treating fluid during its preparation or pumping into a well bore comprises combining a defoaming composition of this invention with the well treating fluid prior to preparing or pumping the fluid.

This invention also provides a method of defoaming a previously formed stable foamed well treating fluid by combining a defoaming composition of this invention therewith.

It is, therefore, a principal object of the present invention to provide improved defoaming compositions and methods.

Other and further objects, features and advantages of the invention will be readily apparent to those skilled in the art upon a reading of the description of preferred embodiments which follows.

DESCRIPTION OF PREFERRED EMBODIMENTS

As mentioned above, defoaming compositions are commonly utilized in a variety of fluids to prevent the fluids from forming foam with air when they are agitated, mixed or the like in the presence of air. In the treatment of wells with well treating fluids, the fluids are commonly mixed or blended in the presence of air on the surface and then pumped into the well bore. If the well treating fluids are inadvertently foamed while being mixed and pumped, adverse results can take place. For example, in completing and stimulating a well, unfoamed treating fluids are often utilized which, if foamed, would not accomplish their intended purposes or would produce less than desirable results.

Some well treating fluids are intentionally formed into stable foams on the surface in order to reduce the densities of the fluids or for other reasons. When such stable foams must be disposed of on the surface, it is often necessary to break the foams in order to efficiently dispose of the non-foamed components. While defoaming compositions and agents have been developed and used successfully heretofore, such defoaming compositions and agents generally have either been environmentally unsafe or have produced less than desirable results when utilized to break previously formed stable foams. By the present invention, improved defoaming compositions and methods are provided which are environmentally safe and also produce better defoaming results than the heretofore utilized defoaming compositions and agents.

The improved defoaming compositions of the present invention are basically comprised of polypropylene glycol, particulate hydrophobic silica and a liquid diluent. The polypropylene glycol utilized in the compositions can have a molecular weight in the range of from about 425 to about 4,000. It is preferred that the polypropylene glycol have a molecular weight at the high end of the above range, most preferably about 4,000. The polypropylene glycol is generally included in the defoaming compositions of this invention in an amount in the range of from about 20% to about 75% by weight of the compositions, most preferably about 30%.

A particulate hydrophobic silica useful in accordance with this invention is silicone oil treated precipitated silica. This hydrophobic silica functions in combination with the polypropylene glycol to defoam fluids very efficiently. The precipitated silica can be prepared by simultaneously adding sulfuric acid and sodium silicate solutions to water with agitation. The pH of the mixture during the reaction is maintained above about 9 whereby smaller particles are continuously dissolved during the precipitation of silica. As a result, uniform particle sizes are obtained. During the precipitation process, the properties of the silica can be varied by changing the ratio of reactants, the reaction time, the reaction temperature and the reaction mixture concentrations. The suspension that results from the precipitation process is filtered and dried followed by milling to reduce the size of agglomerates formed in the drying stage.

The precipitated silica is hydrophobized by spraying it with a uniform coating of silicone oil followed by heating. The quantity of silicone oil utilized is usually about 10% by weight of the precipitated silica. Particularly suitable silicone oil treated precipitated silica for use in accordance with this invention is commercially available under the trade designations SIPERNET D-11™ and SIPERNET D-13™ from the Degussa Company having a place of business in Chester, Pa. The SIPERNET D-11™ has a BET surface area of 90 square centimeters per gram while the SIPERNET D-13™ has a BET surface area of 85 square centimeters per gram. Other properties of the products are the same and are as follows: average particle size—less than 5 microns; tapped density—120 grams per liter; pH—9.5 to 11.5; moisture loss at 105° C. after 2 hours—1.5%; ignition loss after 2 hours at 1,000° C.—5%; methanol wetability— greater than about 60%; $SiO_2$ content—98%; and $NaSO_4$ content—2%.

The particulate hydrophobic silica is generally included in the defoaming compositions of this invention in an amount in the range of from about 10% to about 20% by weight of the compositions, preferably about 16%.

A variety of liquid diluents which also function as dispersion mediums for the particulate hydrophobic silica can be utilized in accordance with the present invention. Examples of preferred such liquid diluents include, but are not limited to, fatty acid methyl esters, olefins having one or more internal double bonds, alpha-olefins, polyalpha-olefins and linear paraffins. Of these, olefins having from about 11 to about 14 carbon atoms and one or more internal double bonds are presently preferred. Generally, the liquid diluent is included in the defoaming compositions of this invention in an amount in the range of from about 10% to about 70% by weight of the compositions, preferably about 54%.

Thus, a preferred defoaming composition of the present invention is comprised of polypropylene glycol having a molecular weight in the range of from about 425 to about 4,000, particulate hydrophobic silica and a liquid diluent. The particulate hydrophobic silica is preferably silicone oil treated precipitated silica.

A more preferred defoaming composition of this invention is comprised of polypropylene glycol having a molecular weight of about 4,000, silicone oil treated precipitated silica and a liquid diluent selected from the group of fatty acid methyl esters, olefins having one or more internal double bonds, alpha olefins, polyalpha olefins and linear paraffins.

The most preferred composition of this invention is comprised of polypropylene glycol having a molecular weight of about 4,000 present in the composition in an amount of about 30% by weight thereof, silicone oil treated precipitated silica present in the composition in an amount of about 16% by weight thereof and a diluent comprised of an olefin having from about 11 to about 14 carbon atoms and one or more internal double bonds present in the composition in an amount of about 54% by weight thereof.

The methods of this invention include methods of preventing the formation of foam in a well treating fluid during its preparation or pumping into a well bore and methods of defoaming a previously formed stable foamed well treating fluid. More specifically, the methods of the present invention of preventing the formation of foam in a well treating fluid during its preparation and pumping are basically comprised of combining a defoaming composition of this invention with said well treating fluid, the defoaming composition being comprised of polypropylene glycol, particulate hydrophobic silica and a liquid diluent. The methods of this invention for defoaming a previously prepared stable foamed well treating fluid are basically comprised of combining a defoaming composition with the foamed well treating fluid, the defoaming composition being comprised of polypropylene glycol, particulate hydrophobic silica and a liquid diluent.

As mentioned above, the defoaming compositions of this invention can be utilized in a variety of different fluids and are particularly well suited for use in well treating fluids. Examples of well treating fluids in which the defoaming compositions can be utilized to prevent the formation of foam are aqueous gelled fluids and cement slurries. An example of a previously prepared foamed well treating fluid which can be efficiently defoamed using a defoaming composition of this invention is a stable foamed cement slurry. Excess previously prepared stable foamed cement slurries are often pumped into pits on the surface and must be disposed of. By combining a defoaming composition of this invention with such foamed cement slurries, e.g., by spraying the defoaming composition thereon, the foamed cement slurries, rapidly and completely break whereby they can be readily disposed of.

In order to further illustrate the defoaming compositions and methods of this invention, the following examples are given.

EXAMPLE 1

Test cement compositions were prepared from five different cement slurries containing various conventional additives, i.e., five cement compositions without defoamer, fine cement compositions containing each of four prior art defoamers and five cement compositions containing the defoaming composition of the present invention. The components and quantities utilized in forming the five cement slurries are given in Table I below.

TABLE I

| Slurry No. | Premium Cement | Water, % by weight of cement | Crystalline Silica, % by weight of cement | Sodium Chloride, % by weight of water | Weighting Agent[1], % by weight of cement | Set Retarder[2], % by weight of cement | Fluid Loss Control Agent, % by weight of cement | Dispersing Agent[4], % by weight of cement |
|---|---|---|---|---|---|---|---|---|
| 1 | Yes | 46 | 35 | 37.2 | 49 | 1 | 0.6[3] | — |
| 2 | Yes | 38 | — | 37.2 | — | 1 | — | — |
| 3 | Yes | 35 | — | 35 | — | 1 | 0.05[5] | 0.3 |
| 4 | Yes | 61 | — | — | — | — | 1.06[6] | — |
| 5 | Yes | 46 | — | — | — | — | 0.8[3] | — |

[1]The weighting agent used was iron oxide.
[2]The set retarder was comprised of modified lignosulfonate.
[3]The fluid loss control agent was hydroxyethylcellulose.
[4]The dispersing agent was the condensation product of formaldehyde, acetone and sodium bisulfate.
[5]The fluid loss control agent was comprised of carboxymethylhydroxyethylcellulose.
[6]The fluid loss control agent was comprised of a modified copolymer of AMPS ® and N,N-dimethylacrylamide.

The theoretical design density of each of the test cement compositions as well as the densities of each test cement composition which did not include a defoamer, each test composition including a prior art defoamer and each test composition including the defoaming composition of the present invention were determined and are given in Table II below. When included, the defoamers were added to the test cement compositions in amounts of 0.25% by weight of cement.

TABLE II

| Slurry No. | Design Density, lb/gal | No Defoamer, lb/gal | Prior Art Defoamer[1], lb/gal | Prior Art Defoamer[2], lb/gal | Prior Art Defoamer[3], lb/gal | Prior Art Defoamer[4], lb/gal | Defoaming Composition of the Present Invention[5], lb/gal |
|---|---|---|---|---|---|---|---|
| 1 | 19.2 | 17.3 | 18.75 | 18.4 | 18.85 | 18.6 | 18.8 |
| 2 | 16.8 | 13.2 | 16.7 | 16.7 | 16.65 | 16.7 | 16.65 |
| 3 | 16.4 | 12.8 | 16.15 | 15.6 | 16.3 | 16.2 | 16.3 |
| 4 | 14.4 | 13.4 | 14.4 | 14.4 | 14.4 | 14.4 | 14.4 |
| 5 | 15.6 | 14.9 | 15.6 | 15.6 | 15.6 | 15.6 | 15.6 |

[1]Tributyl phosphate
[2]Acetylenic diol
[3]Polypropylene glycol mixed with copolymer of ethylene oxide and propylene oxide
[4]Polypropylene glycol
[5]Propylene glycol (MW = 4,000) - 30%, silicone oil treated precipitated silica - 16% and $C_{11}$–$C_{14}$ olefin with internal double bonds - 54%, all by weight of composition.

From Table II it can be seen that the defoaming composition of the present invention substantially equaled or exceeded the defoaming efficiencies of the conventional defoamers. That is, the defoaming composition of the present invention prevented the formation of foam in the test cement compositions to a substantially equal or greater degree than the prior art defoamers tested.

EXAMPLE 2

Stable foamed test cement compositions were prepared containing various prior art defoamers and the defoaming composition of the present invention. The test cement compositions contained the following components: Premium cement; a fluid loss control agent comprised of carboxymethylhydroxyethylcellulose in an amount of 0.3% by weight of cement; water in an amount of 43% by weight of cement; a foaming agent comprised of an ethoxylated alcohol sulfate in an amount of 1.5% by volume of water; a foam stabilizer comprised of cocoamidopropylbetaine in an amount of 0.75% by volume of water; and 1.2% of defoamer by weight of foamed slurry. The unfoamed test compositions had a density of 15.91 lbs. per gallon and after being foamed, the compositions had a density of 10.5 lbs. per gallon. The density of each test cement composition was determined and the results are given below.

| Defoamer | Cement Composition Density, lb/gal |
|---|---|
| tributyl phosphate | 12.39 |
| acetylenic diol | 11.91 |
| polypropylene glycol mixed with copolymer of ethylene oxide and propylene oxide | 10.75 |
| polypropylene glycol | 10.65 |
| present invention (same as footnote 5, Table II) | 15.8 |

From the above, it can be seen that the defoaming composition of this invention is highly efficient in defoaming stable foamed fluids.

The procedure described in Example 2 utilizing the foamed cement slurry described therein was repeated using a defoaming composition of the present invention (footnote 5, Table II) including a linear alpha-olefin having from about 11 to about 14 carbon atoms as the liquid diluent instead of the olefin having internal double bonds. A second test was also conducted using a linear paraffin having from about 11 to about 14 carbon atoms as the liquid diluent. The results of these tests are given below.

| Defoamer | Density, lb/gal |
|---|---|
| present invention, but including linear alpha-olefin diluent | 15.85 |
| present invention, but including linear paraffin diluent | 15.8 |

From the above, it can be seen that various liquid diluents can be utilized in the compositions of this invention without changing the effectiveness of the compositions.

EXAMPLE 3

A base cement slurry comprised of Premium cement, the defoaming composition of the present invention (footnote 5, Table II) in an amount of 1% by weight of cement, and water in an amount of 46% by weight of cement was prepared. Three different fluid loss additives were combined with three test portions of the base cement slurry and the viscosity and fluid loss for each test portion was determined in accordance with the procedures set forth in the *API Specification For Materials And Testing For Well Cements,* API Specification 10, 5th Edition, dated Jul. 1, 1990, of the American Petroleum Institute. The results of these tests are given in Table III below.

TABLE III

| Fluid Loss Additive Used | Quantity, % by weight of cement | 125° F. Fluid Loss at 1,000 psi, cc/30 min. | 125° F. Viscosity, Bc | |
|---|---|---|---|---|
| | | | Initial | 20 min. |
| A[1] | 1.2 | 36 | 8 | 9 |
| B[2] | 0.6 | 20 | 10 | 12 |
| C[3] | 1.2 | 34 | 9 | 7 |

[1]Fluid Loss Additive A was comprised of modified hydroxyethylcellulose.
[2]Fluid Loss Additive B was comprised of a modified copolymer of AMPS ® and N,N-dimethylacrylamide.
[3]Fluid Loss Additive C was hydroxyethylcellulose.

From the results given in Table III it can be seen that the presence of the defoaming composition of the present invention did not materially affect the viscosities or fluid losses of the cement slurries.

EXAMPLE 4

A base cement slurry comprised of premium cement, water in an amount of 46% by weight of cement, a fluid loss additive comprised of a modified copolymer of AMPS® and N,N-dimethylacrylamide in an amount of 0.6% by weight of cement and a set retarder comprised of a modified lignosulfonate in an amount of 0.2% by weight of cement was prepared. To one portion of the base cement slurry, the defoaming composition of this invention (footnote 5, Table II) was added in an amount of 1% by weight of cement. No defoamer was added to a second portion of the base slurry. The test portions of the base slurry were subjected to thickening time tests conducted in accordance with the above mentioned API Specification 10. The results of these tests are set forth below.

| Defoamer of the Present Invention | 140° F. BHCT, 5200 psi, Casing Schedule 5 g, time to reach 70 Bc (hr:mn) |
|---|---|
| No | 6:39 |
| Yes | 5:36 |

From the above results, it can be seen that the presence of the defoaming composition of the present invention had little or no effect on cement slurry thickening time.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of preventing the formation of foam in a well treating fluid during its preparation and pumping into a well bore comprising combining a defoaming composition with said well treating fluid during its preparation, said defoaming composition being comprised of polypropylene glycol, particulate hydrophobic silica and a liquid diluent.

2. The method of claim 1 wherein said polypropylene glycol is present in said composition in an amount in the range of from about 20% to about 75% by weight thereof.

3. The method of claim 1 wherein said particulate hydrophobic silica is silicone oil treated precipitated silica and is present in said composition in an amount in the range of from about 10% to about 20% by weight thereof.

4. The method of claim 1 wherein said liquid diluent is comprised of an olefin having from about 11 to about 14 carbon atoms and one or more internal double bonds and is present in said composition in an amount in the range of from about 10% to about 70% thereof.

5. The method of claim 1 wherein said polypropylene glycol has a molecular weight of about 4,000 and is present in said composition in an amount of about 30% by weight thereof.

6. The method of claim 5 wherein said particulate hydrophobic silica is silicone oil treated precipitated silica and is present in said composition in an amount of about 16% by weight thereof.

7. The method of claim 6 wherein said liquid diluent is comprised of an olefin having from about 11 to about 14 carbon atoms and one or more internal double bonds and is present in said composition in an amount of about 54% by weight thereof.

8. A method of defoaming a previously prepared stable foamed well treating fluid comprising combining a defoaming composition with said foamed well treating fluid, said defoaming composition being comprised of polypropylene glycol, particulate hydrophobic silica and a liquid diluent.

9. The method of claim 8 wherein said polypropylene glycol is present in said composition in an amount in the range of from about 20% to about 75% by weight thereof.

10. The method of claim 8 wherein said particulate hydrophobic silica is silicone oil treated precipitated silica and is present in said composition in an amount in the range of from about 10% to about 20% by weight thereof.

11. The method of claim 8 wherein said liquid diluent is comprised of an olefin having from about 11 to about 14 carbon atoms and one or more internal double bonds and is present in said composition in an amount in the range of from about 10% to about 70% thereof.

12. The method of claim 8 wherein said polypropylene glycol has a molecular weight of about 4,000 and is present in said composition in an amount of about 30% by weight thereof.

13. The method of claim 12 wherein said particulate hydrophobic silica is silicone oil treated precipitated silica and is present in said composition in an amount of about 16% by weight thereof.

14. The method of claim 13 wherein said liquid diluent is comprised of an olefin having from about 11 to about 14 carbon atoms and one or more internal double bonds and is present in said composition in an amount of about 54% by weight thereof.

* * * * *